United States Patent [19]

Weinstein et al.

[11] 4,042,758
[45] Aug. 16, 1977

[54] PHOTOCHEMICAL CELL

[75] Inventors: David H. Weinstein, Brookshire; Joe W. Keeney, Houston, both of Tex.; Gregory M. Haas, McLean, Va.

[73] Assignee: The Superior Oil Company, Houston, Tex.

[21] Appl. No.: 628,083

[22] Filed: Nov. 3, 1975

[51] Int. Cl.² .................. H01M 6/30; C25B 1/02
[52] U.S. Cl. .................. 429/111; 204/129; 204/278; 204/239; 204/290 R; 204/290 F; 126/271
[58] Field of Search .......... 136/89; 429/111; 204/129

[56] References Cited

U.S. PATENT DOCUMENTS

| 3,255,044 | 6/1966 | Powers et al. | 136/89 NB X |
| 3,271,198 | 9/1966 | Windgradoff et al. | 136/89 |
| 3,628,017 | 12/1971 | Lerner | 250/83 CD |
| 3,925,212 | 12/1975 | Tchernev | 250/527 |

FOREIGN PATENT DOCUMENTS 46-20182  1971  Japan .................. 136/89

OTHER PUBLICATIONS

A. Fujishima et al., *J. Chem. Soc. Japan* (Kogyo Kagaku Zasshi), 74, 355-358 (1971).
A. Fujishima et al., *Nature*, vol. 238, July 7, 1972, pp. 37-38.
A. Fujishima et al., *J. Chem. Soc. Japan* (Kogyo Kagaku Zasshi), 72, 108-113 (1969).
F. Mollers et al., *J. Electrochem. Soc.*, vol. 121, pp. 1160-1167, Sept. 1974.
K. L. Hardee et al., *J. Electrochem. Soc.*, vol. 122, pp. 739-741, June 1975.
A. Fujishima et al., *J. Electrochem. Soc.*, vol. 122, pp. 1487-1488, Nov. 1975.
H. Yoneyama et al., *Electrochimica Acta*, vol. 20, pp. 341-345, (1975).
T. Ohnishi et al., *Berichte der Bunsen Gesellschaft fur Physikalische Chemie*, vol. 79, pp. 523-525 (1975).

Primary Examiner—John H. Mack
Assistant Examiner—Aaron Weisstuch
Attorney, Agent, or Firm—Vinson & Elkins

[57] ABSTRACT

A photochemical cell is disclosed which includes an anode of titanium, a cathode of platinum, and a suitable electrolyte. The anode has a thin film of titanium dioxide formed on it, and the anode and cathode are suitably configured in the electrolyte which is normally a very basic potassium hydroxide solution. When the anode is exposed to light of wavelength shorter than 415 nm, an emf of about 1 volt is found between the anode and the cathode so that an external current will flow from the cathode to the anode when they are connected. The cell also extracts $O_2$ from a mixture of $O_2$ and any other gases present.

7 Claims, 4 Drawing Figures

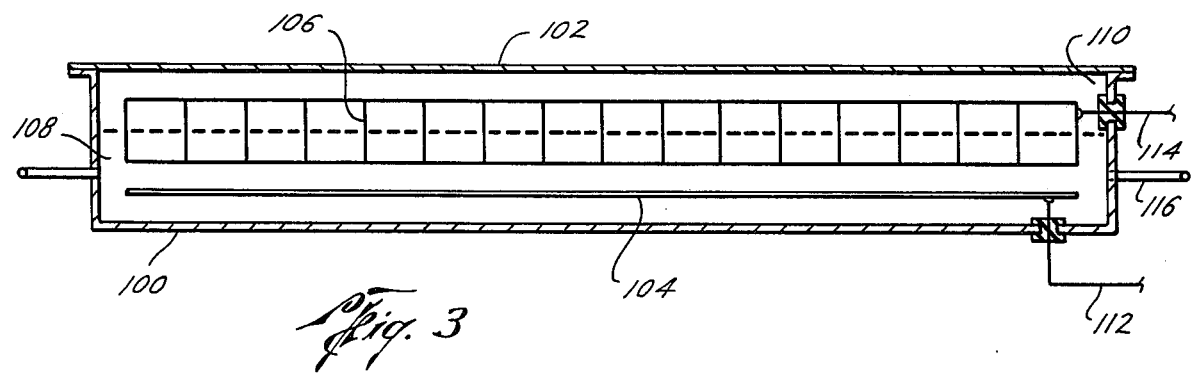
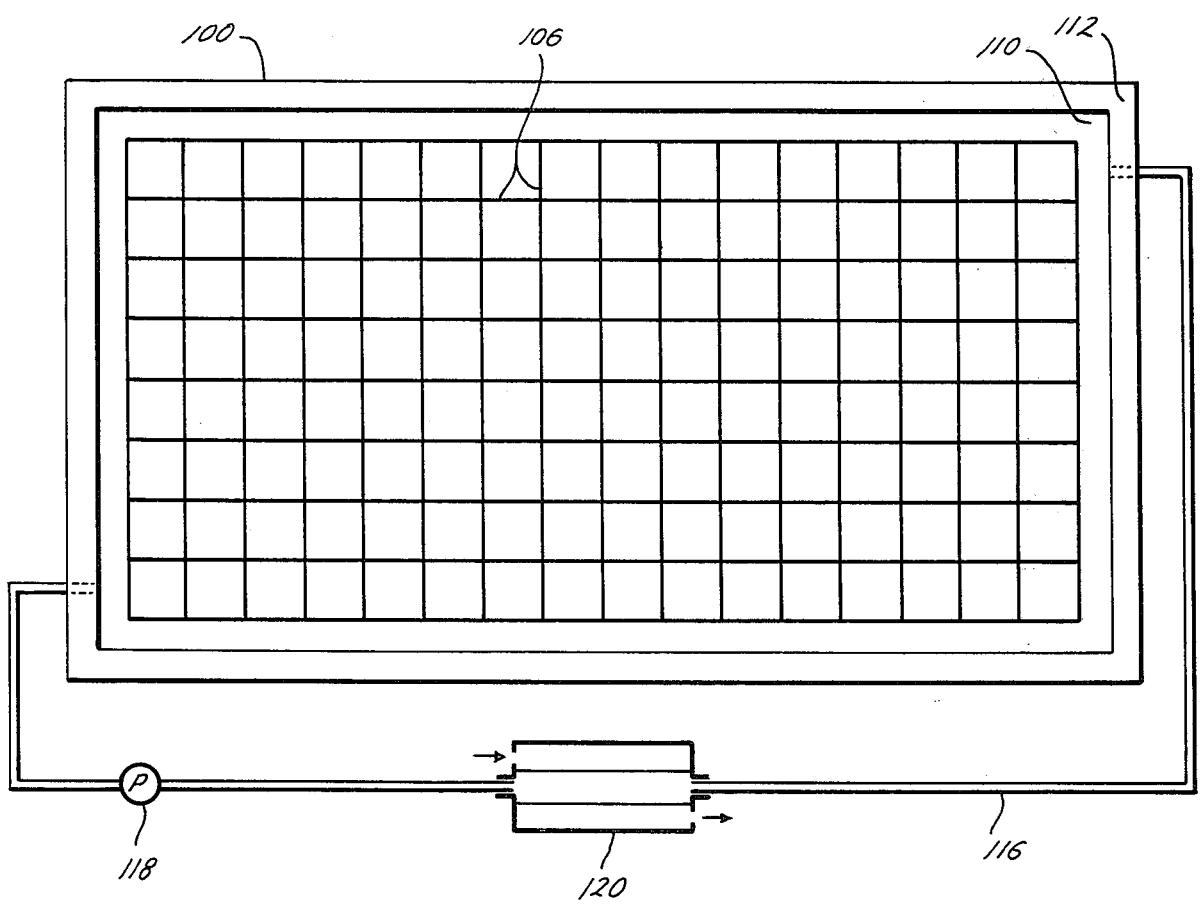

PHOTOCHEMICAL CELL

This invention relates to the field of solar energy and more particularly to solar cells which produce electric power from light radiation.

The study of photoeffects in electrochemical systems goes back to as early as 1839. However, no real effort has been made, until recently, to extend these studies to energy conversion. Quite recently, however, A. Fujishima and K. Honda * have described a photochemical cell based on an n-type $TiO_2$ crystalline electrode in an electrolyte with a platinum cathode. This cell, when illuminated by a source of light of wavelength shorter than 415 nm produces an output emf of about 0.5 volt and a short circuit current of a few micro amperes per square centimeter of illuminated surface of the anode. In addition, a small amount of $O_2$ is evolved at the anode, from which Fujishima and Honda inferred that $H_2$ evolved at the cathode.*

*"Photosensitisation of Electrolytic Oxidation in $TiO_2$ Semiconductor Electrode", *Journal of the Chemical Society of Japan*, vol. 72, p. 108 (1969); "Electrochemical Photolysis of Water at a Semiconductor Electrode" *Nature*, vol. 238, p. 37 (1972).

The present invention received its impetus from the Fujishima and Honda cell, but differs from it significantly. First, instead of using a $TiO_2$ single crystal anode, which is very difficult and expensive to make, the present cell utilizes an anode of titanium metal which has a film of $TiO_2$ formed on it by simple and easy methods to be described. A second major difference in the present cell is that the cathode is not entirely submerged in the electrolyte. This brings into play a new effect of oxygen pumping (described more fully hereinafter) which doubles the emf of the cell and yields currents of around 10 milliamperes per square centimeter under conditions comparable to those of the Honda and Fujishima cell.

It is accordingly, the primary object of the present invention is to provide a light energy conversion cell which does not require expensive crystalline electrodes.

Another object is to provide such a light energy conversion cell which utilizes metallic electrodes, which may be formed in any desired size and configuration.

Another object is to provide a cell which is capable of removing oxygen from an independent mixture of oxygen and other gases and delivering it to a separate container.

These and other objects and advantages of the invention will be apparent from the specification, drawings and claims. In the accompanying drawings:

FIG. 3 is a diagrammatic illustration in vertical section of a photochemical cell in accordance with the present invention showing a possible commercial configuration of the cell; and FIG. 4 is a plan view of the cell of FIG. 3 and also showing a heat exchange apparatus for use with the cell.

Figure 1:
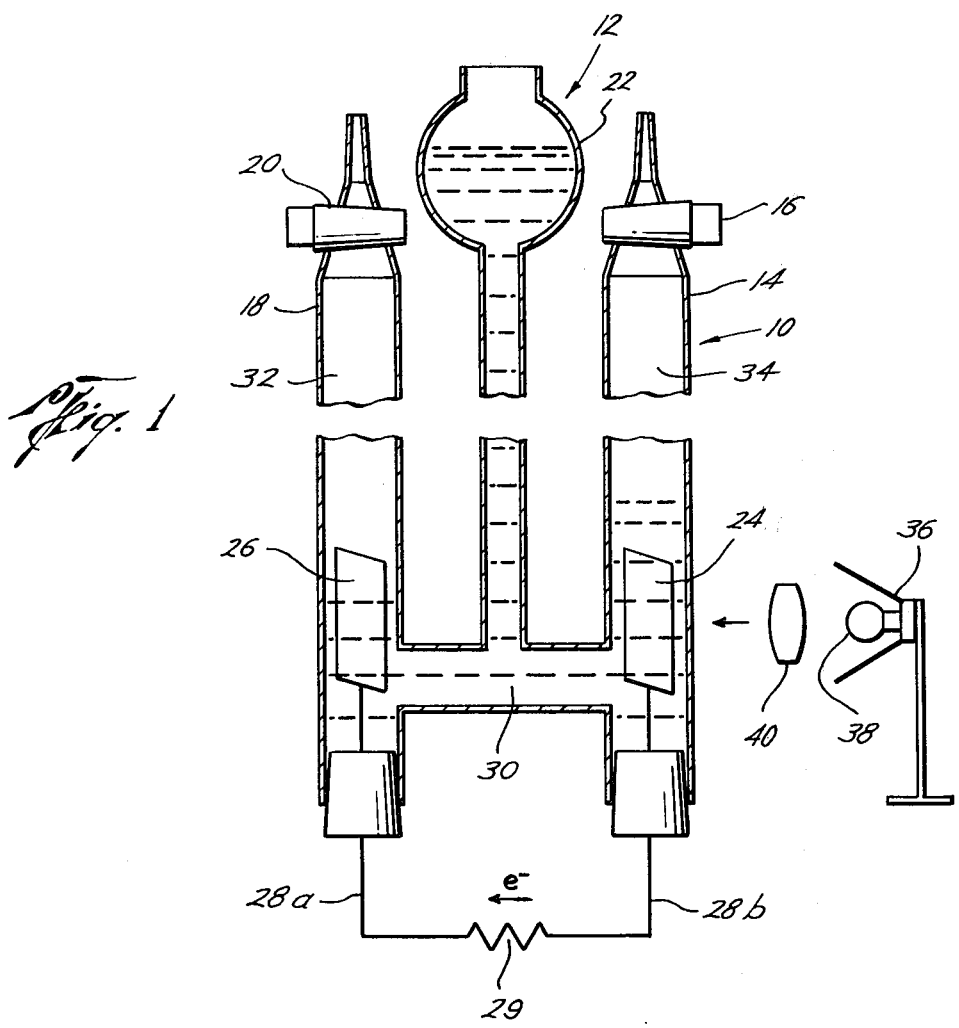
FIG. 1 is a diagrammatic illustration of a photochemical cell in accordance with the present invention which was constructed and utilized for laboratory operation and measurements.

Referring to FIG. 1, there is shown a photochemical cell 10 constructed in accordance with the present invention. The cell is housed within a eudiometer 12 to facilitate the measurement of gas uptake and evolution and to control electrolyte levels. The eudiometer 12 includes a right arm 14, with its outlet controlled by a stopcock 16, and a left arm 18, with its outlet controlled by a stopcock 20. A central bulb 22 is used for filling the eudiometer with electrolyte. An anode 24 of oxidized titanium metal, prepared as disclosed below, is mounted in the right arm 14 of eudiometer 12 and a cathode 26 of platinum metal is mounted in the left arm 18. In the apparatus as constructed, the anode had a total surface area of 2 sq. cm and the cathode a total surface area approximately the same. The anode and cathode are connected by conductors 28a and 28b to a resistive load 29 which may include suitable instruments to measure the emf and current output of the cell. The electrolyte 30 is the eudiometer is 5N KOH and its level so adjusted that the anode 24 is fully immersed in the electrolyte while the cathode 26 is partially exposed to air 32 present in the left arm of the eudiometer above the level of the electrolyte 30. A light source 36 is provided including a 100 watt high pressure mercury lamp 38, the light from which can be focused through lens 40 to strike one face of the anode 24. With the laboratory apparatus shown, approximately 1 watt/cm$^2$ could be placed on the anode.

While the cell of FIG. 1 is illustrated as having a platinum cathode, other suitable metals, such as gold, may be utilized as well. Also, while anode 24 is shown as fully immersed, it may, if preferred, by only partially immersed in the electrolyte.

In operation, the cell of FIG. 1 produced a direct current flow of approximately one milliampere per square centimeter of illuminated surface area of anode 24 with evolution oxygen from the anode. The amount of surface area of cathode 26 exposed to the air 32 appears to have no effect on the output of the cell provided that the length of the cathode-electrolyte-air interface remains constant. On the other hand, if cathode 26 is fully immersed in the electroyte 30, or if the air above the cathode 26 is replaced by a nonoxygen containing gas such as nitrogen, the evolution of oxygen at the anode 24 and the output current of the cell is greatly reduced.

It thus appears that in normal operation of the cell, oxygen is absorbed from the air 32 at the cathode 26 and that an equal amount of oxygen is evolved at the fact of the anode 24.

There are a number of possible, and even competing, reaction schemes to account for the operation of the cell observed. It is not believed to be necessary to one skilled in the art to know or understand the details of the photochemical reactions involved in operation of the cell in order to make practical application of the invention. Nevertheless, such reactions are a matter of interest, and the following are therefore submitted as those believed to be involved in operation of the cell. However, Applicants make no representation that the indicated reactions actually occur, or that other or different reactions do not occur. The reactions are not to be construed in any way as defining or limiting the invention, which of course, is measured solely by the claims.

It was experimentally noted that if the concentration of potassium hydroxide electrolyte is reduced to approximately 1 normal, or if 5 normal ammonium hydroxide is substituted, oxygen evolution is not observed. On the other hand, the photo current remains substantially the same. This suggests that the following reactions are those principally involved in operation of the cell:

$$TiO_2 + 2h\nu \longrightarrow 2e^- + 2p_1 + TiO_2$$

$$2p + (OH)^- \longrightarrow \tfrac{1}{4}(O_2) + H^+ \quad \text{(oxygen released)}$$

$$H^+ + (OH)^- \longrightarrow H_2O$$

at the anode, and $$2e^- + 1/2\,(O_2) + H_2O \longrightarrow 2(OH)^- \quad \text{(oxygen adsorbed)}$$

at the cathode
   Overall $$\tfrac{1}{4}(O_2) + 2h\nu \rightarrow \tfrac{1}{4}(O_2)$$

Figure 2:
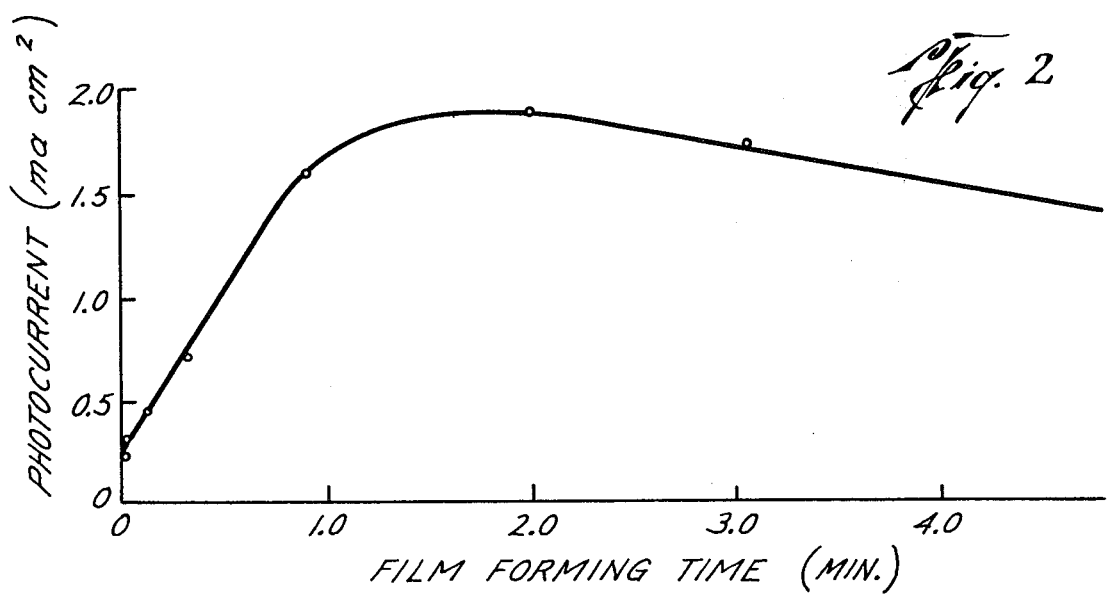
FIG. 2 is a graph of current output as a function of electrolytic forming time for the improved metallic electrode of the present invention.

The oxidized titanium electrodes for use in the photochemical cells of the present invention may be formed in various ways known to those skilled in the art. One relatively simple procedure is to electrolytically oxidize titanium metal in an electrolyte solution under constant current. Using such procedure, there seems to be optimum titanium dioxide film forming time. Referring to FIG. 2, there is shown graphically the results of a series of experiments in which titanium metal electrodes treated for various film forming times at a constant current of eight milliamperes per square centimeter were used in photochemical cells such as shown in FIG. 1, and the open circuit photo current measured. As shown in FIG. 2, the resulting photo current as a function of film forming time in minutes increases for times of up to about two minutes, and thereafter decreases. The optimum film forming time appears to be approximately one to two minutes. Measurements of the corresponding weight increase of the titanium electrodes during oxidation establishes an upper limit for the number of oxygen atoms as approximately $10^{18}$ per square centimeter.

As an alternative to preforming the oxidized titanium electrode, the electrode will self-oxidize in the cell of FIG. 1. If a piece of untreated titanium is utilized for the titanium anode in the FIG. 1 apparatus, and is exposed to the same light from the mercury vapor bulb 38, a small current will flow from the cathode to the anode in the cell, and the anode will gradually develop the dark blue color characteristic of titanium dioxide. After the anode is fully oxidized, the cell displays the same current and oxygen evolution characteristics as with the electrolytically treated anode.

Utilizing the present invention, solar cells of large area can be made at very low cost as compared to prior art solar energy cells. However, it should be made clear that the band gap for $TiO_2$ of 3.0 electron volts requires light of a wavelength shorter than 415 nm. Since only a relatively small portion of sunlight's energy which reaches the earth's surface falls in this portion of the spectrum, cells according to the present invention would make relatively inefficient use of the total energy in sunlight. However, above the earth's atmosphere, the cell's performance would be greatly improved and it would provide an attractive alternative to the solar energy cells presently utilized in spacecrafts, satellites and the like.

Also, it is possible to greatly improve the cell's efficiency by increasing its temperature. The above referenced experiments were conducted, and current output measured, at an ambient temperature of about 26° C. As this temperature is raised, the cell's response would shift into the red making it much more effective and efficient even at the earth's surface.

Referring to FIGS. 3 and 4, there is illustrated, one possible construction or configuration of a cell according to the present invention which might be utilized in practical or commercial installations producing usable quantities of electricity. As illustrated, the cell includes a relatively shallow container 100, which has a bottom and sidewall portions. A transparent cover 102 admits sunlight. Although illustrated as rectangular, the container may be formed in any shape or configuration and may be of any size or area desired. A thin sheet 104 of titanium metal, having a titanium dioxide film formed thereon as described above is suitably mounted in the bottom of container 100 and serves as the cell anode. The cathode is formed from a plurality of platinum or platinum plated strips 106 disposed vertically in an intersecting, parallel, or "egg crate," configuration above the titanium anode. The container is filled with electrolyte 108 which completely covers the anode 104, but leaves a portion of each of the cathode plates 106 partially exposed to an oxygen containing gas such as air 110, which is present in the container above the level of the electrolyte. Suitable conductors 112 and 114 attached to the anode and cathode respectively, conduct the electricity generated by the cell to suitable transformer apparatus (not shown) where it may be transformed into current at conventional voltages for utilization as desired.

In the enclosed cell of FIGS. 3 and 4 the oxygen evolved at the anode would simply be recycled through the air 110. If desired however, the cell could be modified to function as an oxygen generator by adding suitable means for supplying fresh air to the cathode and for trapping the oxygen evolved at the anode.

The cell may also function as a conventional circulating fluid solar heating apparatus by providing conduit 116 through which the heated electrolyte solution 108 may be circulated, by means of pump 118, between the cell and any suitable heat exchange apparatus, indicated diagrammatically at 120.

The above and foregoing disclosure and description of the invention is illustrative and explanatory thereof only, and various changes in the size, shape and materials, as well as in the details of the illustrated construction, may be made within the scope of the appended claims, without departing from the spirit of the invention.

What is claimed is:
1. In a photochemical cell of the type utilizing an alkaline electrolyte solution, a cathode in contact with said electrolyte, and an anode of titanium dioxide in contact with said electrolyte to produce electric current from light energy, the improvement which comprises:
   said cathode bieng selected from a group consisting of platinum and gold and being partially immersed in said electrolyte and partially exposed to an oxygen-containing gas.
2. A photochemical electric cell comprising:
   a container;
   an electrolyte of approximately five normal aqueous potassium hydroxide solution in said container;
   an anode of titanium metal at least partially immersed in said electrolyte and having formed thereon a surface film of titanium dioxide;
   a cathode selected from the group consisting of platinum and gold, said cathode being partially immersed in said electrolyte and partially exposed to an oxygen-containing gas whereby oxygen gas is evolved at said anode during operation of said cell;

conductor means attached to said anode and said cathode for forming an electric circuit therebetween; and means for exposing the titanium dioxide film on said anode to light.

3. The apparatus according to claim 2, comprising additionally means for capturing the oxygen gas evolved at said anode.

4. A photochemical cell comprising:

a container having a bottom and sidewall portions;

an electrolyte of approximately five normal aqueous potassium hydroxide solution in said container;

an anode of titanium metal having a surface layer of titanium dioxide thereon mounted in said container approximately parallel to the bottom thereof and fully immersed in said electrolyte solution;

a cathode disposed in said container above said anode and being only partially immersed in said electrolyte solution and partially exposed to an oxygen-containing gas whereby oxygen gas is evolved at said anode during operation of the cell;

said cathode being selected from the group consisting of platinum and gold; and electric current conductor means attached to said anode and said cathode.

5. The cell according to claim 4 comprising additionally a transparent cover on said container and an oxygen containing gas in said container between said electrolyte and said cover in contact with the portion of said cathode above the level of said electrolyte.

6. The cell according to claim 4 wherein said cathode comprises a plurality of parallel metal strips.

7. The apparatus according to claim 4 comprising additionally conduit means for circulating heated electrolyte solution from said container through heat exchange means whereby useful heat may be extracted from said electrolyte.

* * * * *